126,212

UNITED STATES PATENT OFFICE.

JOSEPH D. HUSBANDS, JR., OF ST. LOUIS, MISSOURI.

IMPROVEMENT IN PREPARING HORSE-RADISH FOR USE.

Specification forming part of Letters Patent No. 126,212, dated April 30, 1872.

Specification describing a new and useful Improvement in Desiccated and Powdered Horse-Radish, invented by JOSEPH D. HUSBANDS, Jr., of St. Louis, in the county of St. Louis and State of Missouri.

My invention consists of a new article of manufacture for food, medicinal, and other purposes, the same being desiccated and powdered horse-radish, either alone or in combination with other condiments of salt, pepper, mustard, or spices, or other articles that will improve its flavor.

I dry or desiccate the roots in any approved way, and then grind or pulverize by any approved means, and pack together with the said condiments or not, as wanted. Thus I provide a new article of desiccated food and for medicinal and other purposes.

Having thus described my invention, I claim as new and desire to secure by Letters Patent—

The new manufacture, being desiccated and powdered horse-radish, either alone or in combination with other condiments, substantially as specified.

JOSEPH D. HUSBANDS, JR.

Witnesses:
   C. E. PEARCE,
   E. S. CLAUSE.